July 10, 1945.　　　R. R. CURTIS　　　2,379,868
PUMP SEAL CONSTRUCTION
Filed May 27, 1943　　　2 Sheets-Sheet 1
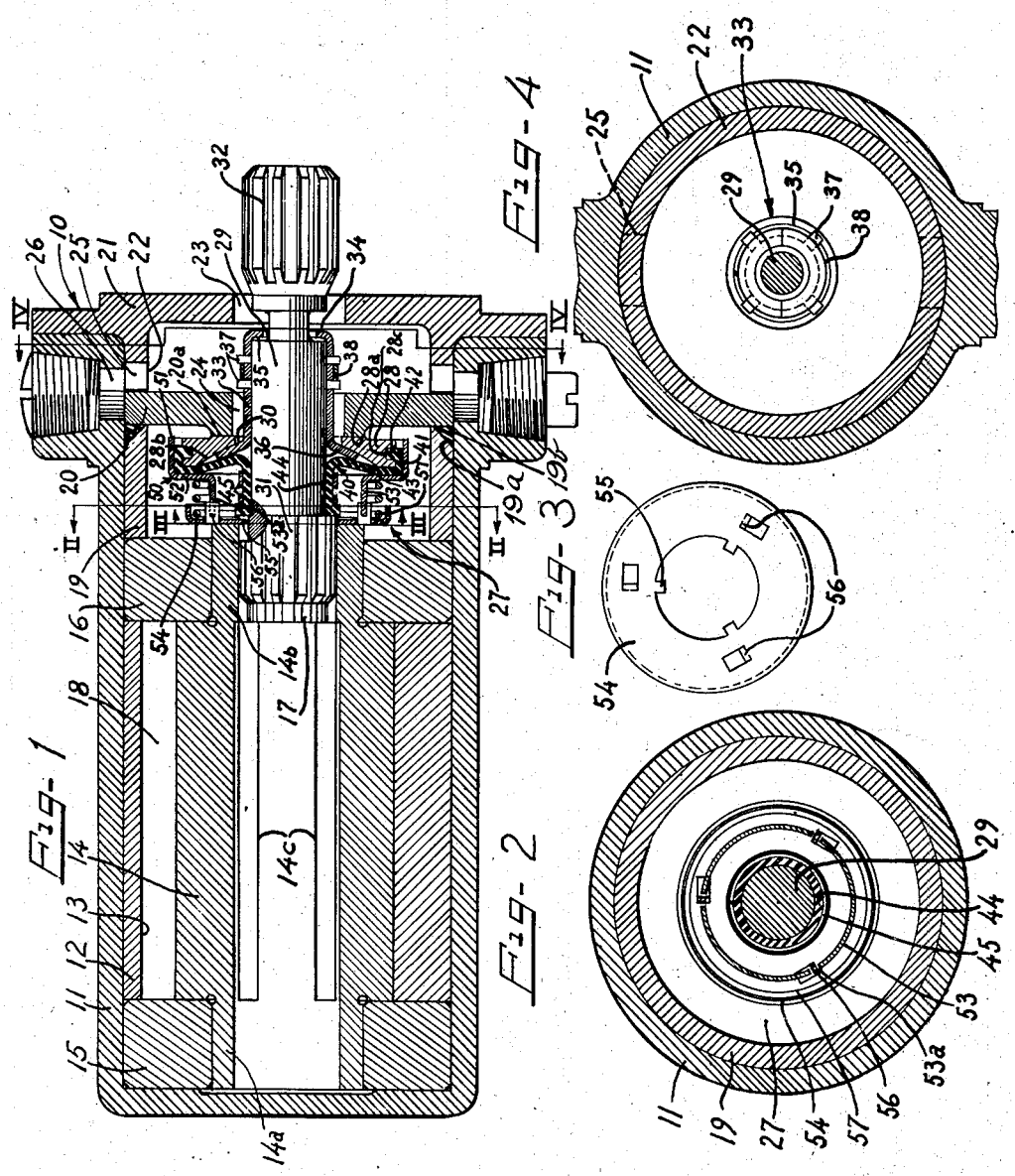
Inventor
RUSSELL R. CURTIS
by Charles W. Hills Attys.

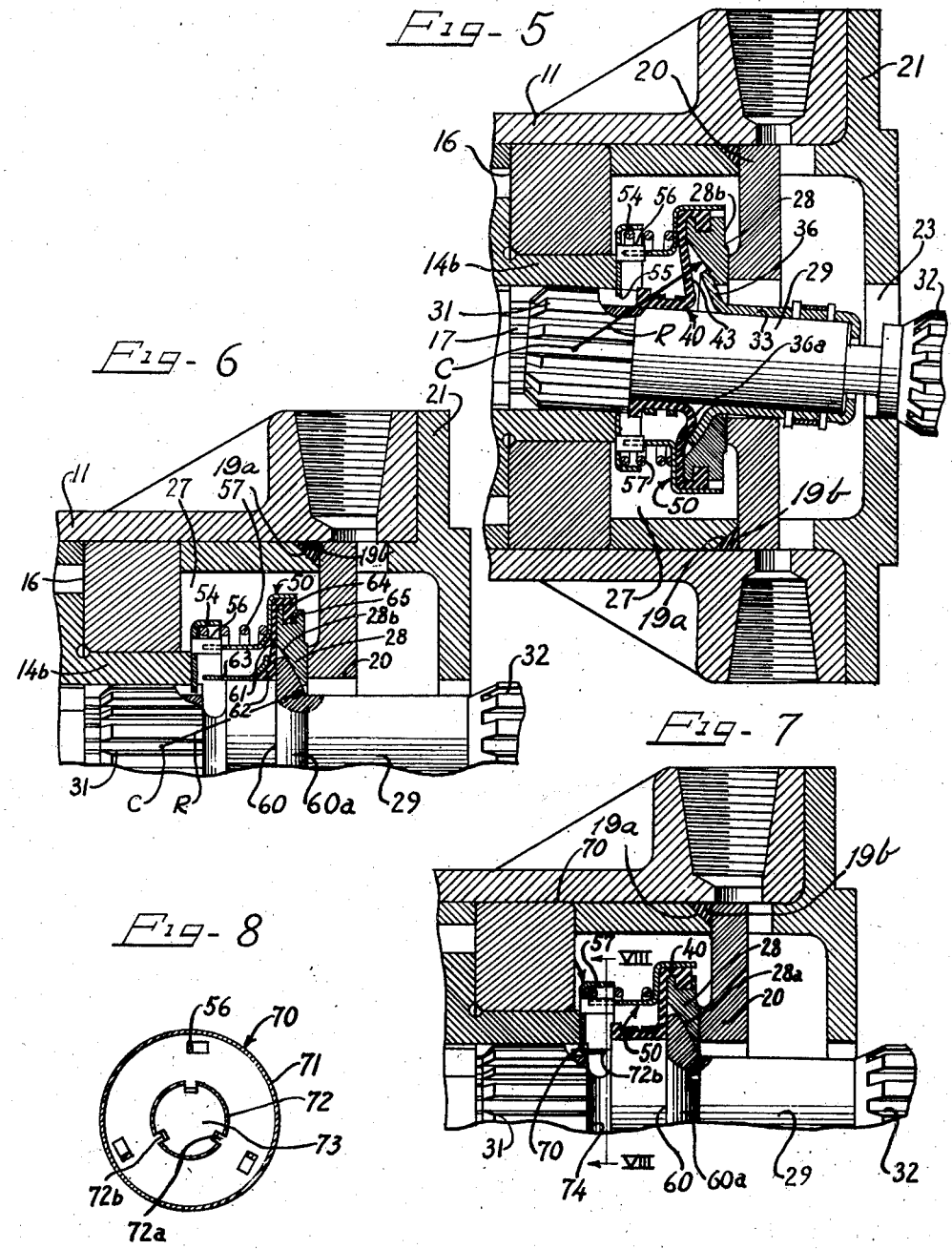

Patented July 10, 1945

2,379,868

UNITED STATES PATENT OFFICE 2,379,868

PUMP SEAL CONSTRUCTION

Russell R. Curtis, Dayton, Ohio, assignor to Curtis Pump Company, Dayton, Ohio, a corporation of Ohio Application May 27, 1943, Serial No. 488,647

12 Claims. (Cl. 286—11)

This invention relates to seal constructions for relatively rotating members wherein the members can be widely displaced relative to each other during operation without in any way disturbing the seal.

Specifically, the invention relates to shaft seals especially useful in pump constructions and including relatively rotating seal rings in sliding face to face engagement together with cooperating bearing surfaces on the shaft and the rotating seal ring accommodating angular displacement of the shaft without affecting the sliding face to face contact of the sealing rings.

This invention will be hereinafter specifically described as embodied in rotary vane pumps such as aircraft engine fuel pumps, but it should be understood that the seals of this invention are not limited to such uses since they are applicable to many mechanical installations.

In accordance with this invention, a stationary seal member receives a rotating seal member in sliding face engagement therewith and a shaft projects freely through both seal members. This shaft has splined connection at its ends with a prime mover such as an aircraft engine and with the rotor of a pump. Since the shaft may wobble in operation, it is highly desirable that such wobbling movements have no effect upon the sliding face engagement of the seals and, in accordance with this invention, the shaft is equipped with an arcuate bearing surface adapted to thrust against a complementary bearing surface on the rotating seal member. A rubber sleeve has a reduced-diameter end portion in sealing engagement on the shaft, an enlarged diameter opposite end portion embracing the rotating seal ring and preferably seated in a groove of this seal ring, and a flexible shoulder or diaphragm portion connecting the end portions and adapted to flex for permitting relative movement between the rotating seal ring and the shaft without allowing leakage between the shaft and seal ring. As the shaft is wobbled or cocked, the arcute bearing surfaces on the shaft and on the rotating seal will slide relative to each other without in any way disturbing the position of the rotating seal and the flexible diaphragm portion of the rubber sleeve will likewise accommodate such movements without moving the rotating seal.

A feature of the invention is the provision of a cup member embracing the large diameter end of the rubber sleeve to prevent radial displacement of this end from the rotating seal ring and to drive the rotating seal ring from the shaft through a spring retainer having keyed connection with a splined portion of the shaft. This retainer has tangs projecting inwardly into several spaces between the spline teeth on the shaft so that it necessarily rotates with the shaft. Additional tangs are struck up from the retainer to seat in slots provided in the cup for driving the cup with the retainer. The cup preferably has a shoulder portion overlying the outer marginal portion of the rubber sleeve diaphragm or shoulder and a coiled spring is held under compression between the retainer and this shoulder of the cup to urge the rotating seal ring against the stationary seal ring.

The spring retainer is preferably bottomed on the hub of the pump rotor and, since this rotor is driven by the shaft, no relative movement or rubbing action will occur between the retainer and its hub support.

It is, then, an object of this invention to provide a seal construction for relatively moving members accommodating angular displacement of the members throughout a wide range without interference with the sealing efficiency.

A still further object of the invention is to provide a shaft seal of the relatively rotating seal ring type wherein the shaft extends freely through a stationary seal ring and a rotating seal ring and in which the shaft has an arcuate bearing surface thrusting against a complementary bearing surface on the rotating seal ring so that the shaft can be rocked without rocking the seal rings.

A further object of the invention is to provide a seal construction of the relatively rotating seal ring type for a shaft adapted to rock about a center point, wherein the shaft and rotating seal ring have arcuate bearing surfaces struck from a radius centered on the rocking center of the shaft so that the shaft can readily rock about this center without rocking the rotating seal ring.

A specific object of the invention is to provide a seal for a rotary vane pump having a splined rotor hub receiving a splined driving shaft wherein a rotating seal ring is driven through a metal cup member from a spring retainer bottomed on the splined rotor hub and having keyed connection with the splined end of the shaft.

A further object of the invention is to provide a pump seal between a pump shaft and a pump casing having a bearing surface cooperating with a bearing surface on the shaft to accommodate rocking of the shaft and also having a flexible rubber sleeve between the seal and shaft preventing leakage along the shaft in any relative position of the shaft and seal.

Other and further objects of the invention will become apparent to those skilled in the art from the following detailed description of the annexed sheets of drawings which, by way of preferred examples only, illustrate several embodiments of the invention.

On the drawings:

Figure 1 is a longitudinal cross-sectional view, with parts in elevation, of a rotary vane pump equipped with a seal construction according to this invention.

Figure 2 is a transverse cross-sectional view taken along the line II—II of Figure 1.

Figure 3 is a transverse cross-sectional view taken along the line III—III of Figure 1.

Figure 4 is a transverse cross-sectional view taken along the line IV—IV of Figure 1.

Figure 5 is an enlarged fragmentary view similar to Figure 1 illustrating the positions of the seal parts when the drive shaft is in an extreme cocked position.

Figure 6 is a fragmentary cross-sectional view similar to Figure 1 illustrating a modified seal construction according to this invention.

Figure 7 is a view similar to Figure 6 illustrating a further modified seal construction according to this invention.

Figure 8 is a transverse cross-sectional view taken along the line VIII—VIII of Figure 7.

As shown on the drawings:

In Figure 1, the reference numeral 10 designates generally a rotary vane fuel pump especially adapted for aircraft usage mounted in a casing 11 having a closed end and an open end. A liner 12 is seated in the casing 11 and has an inner surface 13 providing the pump bore. A rotor 14 is mounted for rotation in the casing and has a reduced-diameter hub 14a at the closed end of the casing rotatably mounted in a bearing 15 seated on the closed end of the casing. The rotor 14 also has a second reduced-diameter hub 14b rotatably mounted in a second bearing 16 carried in the casing in spaced relation inwardly from the open end of the casing. This hub 14b has internal spline teeth 17.

As it customary in rotary vane pumps, the rotor 14 has slots 14c therein slidably carrying vanes 18 acting on the surface 13 of the liner 12.

A spacer sleeve 19 is mounted in the casing 11 and is bottomed on the bearing 16. The sleeve 19 is beveled as at 19a and a seal gasket 19b is seated around the beveled end of the sleeve in the space between the bevel and casing 11. A stationary seal ring 20 is next mounted in the casing and is bottomed on the spacer sleeve 19 against the seal gasket 19a. An end cap 21 closes the open end of the casing and has a skirt or gland portion 22 extending into the casing for thrusting relation with the stationary seal ring 20 to clamp this seal ring between the sleeve 19 and the cover 21. The cover 21 is centrally apertured as at 23 and the seal ring 20 is centrally apertured as at 24. The gland 22 of the cover can be apertured at spaced intervals therearound as at 25 to join the interior of the casing with drain ports 26.

A seal chamber 27 is thus provided in the casing between the stationary seal ring 20 and the bearing 16. A rotating seal ring 28 is disposed in this chamber 27 and has a raised end face portion 28a for sliding sealing engagement with a raised end face portion 20a on the stationary seal ring 20 around the aperture 24 of this stationary ring.

The rotating seal ring 28 has the opposite end face thereof provided with an arcuate recess 28b providing a bearing surface. A groove 28c is formed around the periphery of the seal ring 28 for a purpose to be more fully hereinafter described.

A drive shaft 29 projects through the aperture 23 of the cover 21, the aperture 24 of the seal ring 20, and through a central aperture 30 in the seal ring 28. The inner end of this drive shaft is splined as at 31 and is seated in the splined hub 14b in splined engagement with the teeth 17 of this hub.

The splined connection between the hub 14b and the shaft 29 is such that the shaft can rock relative to the hub.

The shaft 29 has a second splined end 32 projecting beyond the cover 21. This splined end 32 is adapted to be connected to a prime mover such as an aircraft engine drive shaft.

The stationary seal ring 20 is preferably a compressed carbon ring while the rotating ring 28 is metallic and is preferably a hard metal alloy such as nitralloy.

The above descriptions apply to all figures of the drawings.

In the embodiment of the invention illustrated in Figures 1 to 5, the shaft 29 has the portion thereof between the splined ends 31 and 32 of lesser diameter than the minor diameters of the splined ends so that these splined ends can be simultaneously cut during a single milling operation. In this embodiment a two-piece metal sleeve 33 surrounds the intermediate portion of the shaft between the splined ends 31 and 32, and has an inturned flange 34 at one end thereof bottomed on a shoulder 35 provided on the shaft adjacent the splined end 32 thereof. The other end of the sleeve 33 has an outturned skirt 36 of arcuate shape adapted to seat in the arcuate recess 28b of the rotating seal ring 28. Each piece of the two-piece sleeve 33 has a pair of opposed tangs 37 struck outwardly therefrom and a metal snap ring 38 encircles the sleeve between the opposed tangs 37 to clamp the sleeve parts onto the shaft 29.

The sleeve 33 is thus fixedly mounted on the shaft 29 and has a skirt providing an arcuate bearing surface for the shaft cooperating with the bearing surface provided by the arcuate recess of the rotating seal ring.

A rubber sleeve 40 has a large diameter open end 41 embracing the seal ring 28 and equipped with an inturned bead or lip 42 seated in the groove 28c around the seal ring. A flexible diaphragm or shoulder portion 43 of the sleeve extends radially inward from the enlarged end portion 41 thereof in spaced relation from the recessed face 28b of the seal ring 28 and merges into a reduced-diameter cylindrical portion 44 snugly embracing the shaft 29 and receiving metal snap rings 45 therearound to connect the sleeve in sealing relation with the shaft.

A metal cup member 50 has a large open end 51 covering the portion 41 of the sleeve 40 and holding the sleeve against radial displacement off of the seal ring 28 to maintain sealing relation between the sleeve and seal ring. This cup member 50 also has an inturned flange portion 52 overlying a portion only of the shoulder or diaphragm portion 43 of the sleeve and continuing radially inward to a reduced-diameter cylindrical portion 53 of larger diameter than the portion 44 of the sleeve so as to surround this sleeve portion in spaced relation.

A metal spring retainer cup 54 is bottomed on the rotor hub 14b and has an aperture therethrough freely receiving the shaft. This retainer 54, however, has several tangs 55 around the aperture thereof extending into several spaces between the spline teeth on the shaft end 31 thereby connecting the retainer for corotation with the shaft and rotor hub 14b.

The bottom of the retainer, in addition, has a plurality of tangs 56 struck upwardly therefrom to seat in slots 53a formed in the end of the portion 53 of the cup member 50.

A coil spring 57 is bottomed on the retainer 54 and acts against the flange or shoulder 52 of the cup 50 for urging the cup, diaphragm portion 43 of the rubber sleeve 40, and sealing ring 28 toward the stationary seal ring 20 to maintain the face 28a of the seal ring 28 in sliding face engagement with the face 20a of the seal ring 20.

The tangs 55, as explained above, will drive the retainer 54 with the shaft and rotor hub and the tangs 56, in turn, will drive the cup 50 with the retainer. The cup 50, in turn, has a snug fit with the portion 41 of the sleeve, and this portion 41 of the sleeve has a snug fit with the periphery of the rotating seal ring 28. Therefore, the rotating seal ring is drivingly connected around the periphery thereof for corotation with the drive shaft and no relative slippage between the drive shaft and rotating seal ring will occur. At the same time, however, the spring 57 is effective to act on the seal ring 28 to maintain sealing relation with the stationary seal ring 20.

As best shown in Figure 5, the splined end 31 of the driver 29 cooperates with the spline teeth 17 in the rotor hub 14b so that the driver 29 can be cocked or oscillate about a center point C. The cooperating spline teeth are developed on an involute curve to permit such rocking or cocking of the driver 29 about a center such as C. The bearing face of the skirt 36 and the bearing face of the recess 28b are struck from a radius R centered on the same center point C so that the skirt 36 can ride over the bearing face 28b without in any way cocking the sealing ring 28. The flexible diaphragm or shoulder portion 43 of the rubber sleeve 40 can readily be deformed during such cocking movement without interfering with the movement and at the same time maintain the sealing relation between the shaft and sealing ring 28. Part of the portion 44 of the sleeve 40 may roll off of the shaft to add to the length of the diaphragm portion 43 during extreme cocking of the shaft. Obviously, if necessary the portion 43 could stretch to permit extreme cocking of the shaft.

As shown in Figure 5, the driver 29 is cocked to an extreme position and bears against the wall defining the aperture 23 of the cover 21. In actual operation, of course, such extreme positions would never be reached, but the drawing illustrates that the seal will function efficiently even if such positions were reached.

The tangs 55 on the retainer 54 do not project into the bottom of the spaces between the spline teeth on the driver end 31 so that the cocking or wobbling movements of the driver will not cock or wobble the retainer 54 off of the rotor hub 14b. As a result, the spring pressure on the rotating seal 28 is not affected by cocking or wobbling of the driver.

The skirt 36 of the sleeve 33 provides a hollow space 36a into which the flexible shoulder or diaphragm portion 43 of the sleeve 40 can move during the cocking of the driver.

As shown in Figure 6, instead of having an arcuate bearing surface formed by a separate sleeve as in Figures 1 to 5, the driver 29 can have an integral shoulder 60 between the splined ends 31 and 32 thereof and this shoulder 60 has an arcuate bearing face 60a struck from the same radius R centered on the rocking center C of the driver 29 to cooperate with the recessed face 28b of the rotating seal ring 28 in the same manner as described in Figures 1 to 5.

Instead of providing a rubber sleeve 40 for sealingly connecting the rotating seal ring 28 with the driver 29 as in Figures 1 to 5, as shown in Figure 6 this rubber sleeve can be in the form of a substantially flat disk 61 having a circular opening through the center thereof receiving the shaft therethrough and bounded by a thickened portion 62. A metal sleeve 63 is pressed onto the driver 29 against the thickened portion 62 to hold this thickened portion against the shoulder 60 and thereby sealingly connect the rubber disk with the driver 29. The outer marginal portion of the rubber disk 61 can have an upturned flange 64 thereon with an inturned bead 65 for seating in the groove formed around the rotating seal ring 28. The structure of Figure 6 will operate in the same manner as described in connection with Figures 1 to 5, but the formation of the integral shoulder 60 on the driver 29 eliminates the possibility of cutting both splined ends 31 and 32 on the driver in the same operation, because this shoulder is of larger diameter than the minor diameter of the splined ends.

In the modification shown in Figures 7 and 8, the rubber sleeve 40 of Figures 1 to 5 is used with a shoulder construction as in Figure 6, and the operation of the seal is the same as in Figure 6. In Figures 7 and 8, however, a different type of retainer 70 is used. This retainer 70, as best shown in Figure 8, is a stamped metal washer with an upstanding flange 71 around the outer periphery thereof and a second upstanding flange 72 around the central aperture 73 thereof. The inner flange 72 has a plurality of tangs therearound pressed into the aperture 73 as at 72a and thence extending parallel with the flange 72 as at 72b to provide key connections with the splined end 31 of the driver 29.

The bottom wall of the resulting washer of U-shaped cross section has tangs 56 stamped upwardly therefrom the same as the retainer 54 for cooperating with the cup member 50 as described hereinabove.

As shown in Figure 7, the driver 29 has a groove 74 adjacent the splined end 31 thereof into which the portions 72b can project. The spring 57, as in Figures 1 to 6, is held under compression between the cup 50 and the retainer 70.

From the above descriptions it will be understood that the invention now provides seals wherein sealing efficiency is maintained even though the relatively rotating members being sealed are cocked or wobbled during operation. According to the invention, arcuate bearing surfaces are provided to permit the cocking or wobbling of a drive shaft without affecting the sealing relation of the parts. These arcuate bearing surfaces are preferably generated from radii centered on the axis of wobbling of the drive shaft.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A shaft and seal construction comprising a stationary seal member having a sealing face, a rotating seal member having a cooperating sealing face for sliding contact with said face of the stationary seal member, said rotating seal member having a bearing face accommodating tilting movements, a shaft extending freely through both of said sealing members, means on said shaft providing a bearing face tiltable on the bearing face of the rotating seal member, a flexible rubber member embracing said rotating seal member and said shaft in sealing relation therewith, a cup member surrounding said rubber member having a shoulder portion and a reduced-diameter collar portion extending from said shoulder portion, a retainer keyed to said shaft, means connecting said retainer and cup member for corotation, and a spring bottomed on said retainer acting against said shoulder of the cup member for urging the rotating seal member against the stationary seal member.

2. A shaft seal construction comprising sealing members in sliding sealing engagement, a shaft extending through said members, a flexible sealing diaphragm connecting the shaft and one of the sealing members to prevent leakage between the shaft and sealing members, and cooperating bearing surfaces on said one sealing member and said shaft accommodating rocking of the shaft relative to the sealing member.

3. A seal construction comprising a pair of apertured seal members, means urging said seal members into sliding face to face engagement, a shaft extending through the apertures of said members, means on said shaft providing an arcuate rocking surface, means connecting one of said seal members with said shaft for corotation, and said one seal member having an arcuate bearing surface thereon cooperating with said means on the shaft to accommodate rocking movement of the shaft without moving the seal members.

4. A seal construction comprising an apertured stationary seal member, an apertured rotating seal member in sliding face engagement with a face of said stationary seal member, said rotating seal member having an arcuate recess in the face thereof opposite the face engaging the stationary seal member, a shaft extending through the apertures of both seal members, skirt means on said shaft adapted to tilt in said recess of the rotating seal member, and a flexible sleeve member accommodating tilting movements of the shaft relative to the rotating seal member connecting the rotating seal member and shaft in sealing relation.

5. A pump construction including a pump rotor having an internally splined hub, a driver rockably splined in said hub, a stationary seal member having a sealing face in spaced opposed relation from said hub, a rotating seal member having a sealing face cooperating with the sealing face of said stationary seal member, flexible diaphragm means in the space between the stationary seal member and the rotor hub connecting the driver and rotating seal member in sealing relation, means bottomed on the rotor hub urging the rotating seal member against the stationary seal member, and means defining relatively rocking faces on said driver and on said rotating seal member accommodating tilting of the driver without moving the seal members.

6. In a seal construction including a seal ring and a shaft projecting through said ring, the improvements of a flexible diaphragm yieldably connecting said seal ring and shaft in sealing relation, means keyed to said shaft embracing said diaphragm for driving the seal ring with the shaft, and said shaft and said seal ring having cooperating tilting surfaces sealed by the diaphragm and accommodating tilting of the shaft.

7. In a seal construction for a splined shaft, a spring retainer surrounding said shaft having tangs projecting into the spaces between the splined teeth on said shaft, a cup member having a slotted end portion, tangs on said spring retainer seated in the slots of said cup member, and a seal ring seated in said cup member for corotation therewith whereby said shaft will drive said retainer, said retainer will drive said cup member, and said cup member will drive said seal ring.

8. In a seal construction of the relatively rotating seal ring type including apertured seal rings in sliding face engagement, and a shaft extending through said seal rings, the improvements of a multi-piece sleeve on said shaft, means securing the sleeve pieces to the shaft, skirt portions on the sleeve pieces defining an annular rocking face around the shaft, and one of said seal rings having a face portion receiving said skirt in tiltable relation.

9. In a seal construction including an apertured rotating seal ring, and a shaft extending freely through the aperture of the seal ring, the improvements of means defining a rocking face on said shaft acting against a face of said seal ring, and a rubber sleeve connecting said shaft and seal ring in sealing relation whereby said shaft can tilt relative to said seal ring without tilting the seal ring and without permitting leakage between the shaft and seal ring.

10. In a seal construction, a stationary seal ring, a rotating seal ring in sliding face engagement with said stationary seal ring, said rotating seal ring having an annular groove therearound, a rubber sleeve having a beaded end portion seated in said groove of the rotating seal ring, said rubber sleeve embracing said shaft in sealing engagement therewith, and said shaft having an arcuate rocking face acting on said rotating seal ring and disposed between the sleeve and seal ring.

11. In a pump construction including a pump rotor having an internally splined hub, a shaft rockably splined in said hub adapted to tilt about a center point in said hub, a seal ring surrounding said shaft in spaced relation having a concave rocking face struck from a radius centered on the tilting center of the shaft, means defining a convex rocking face on said shaft struck from a radius centered on the rocking center of said shaft and riding on the concave face of said bearing ring, and flexible means connecting said shaft and said seal ring in sealing relation while permitting rocking of the shaft on the bearing ring.

12. In a seal construction a shaft having splined ends and an intermediate reduced-diameter connecting portion, a pair of semi-cylindrical sleeve members surrounding the reduced-diameter portion of said shaft, means securing said sleeve members on the shaft to provide an annular sleeve thereon, said sleeve members having outturned arcuate skirt portions providing a rocking face on the shaft, and a seal member having a concave recess receiving the rocking face of the skirt portion.

RUSSELL R. CURTIS.